US010852433B2

(12) United States Patent
Chen (10) Patent No.: US 10,852,433 B2
(45) Date of Patent: Dec. 1, 2020

(54) LIDAR RESISTANT TO INTERFERENCE AND HACKING

(71) Applicant: Massachusetts Institute of Technology, Cambridge, MA (US)

(72) Inventor: Jerry C. Chen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 352 days.

(21) Appl. No.: 15/922,397

(22) Filed: Mar. 15, 2018

(65) Prior Publication Data

US 2019/0285749 A1    Sep. 19, 2019

(51) Int. Cl.
| | |
|---|---|
| *G01S 17/00* | (2020.01) |
| *G01S 17/26* | (2020.01) |
| *G01S 7/4861* | (2020.01) |
| *G01S 7/487* | (2006.01) |
| *G01S 17/89* | (2020.01) |

(52) U.S. Cl.
CPC .............. *G01S 17/26* (2020.01); *G01S 7/487* (2013.01); *G01S 7/4861* (2013.01); *G01S 17/89* (2013.01)

(58) Field of Classification Search
USPC .............................................. 356/4.01, 5.01
See application file for complete search history.

(56) References Cited

U.S. PATENT DOCUMENTS

| | | | | |
|---|---|---|---|---|
| 4,140,060 A | * | 2/1979 | Brenner ................ | F41G 7/2246 102/214 |
| 5,150,310 A | * | 9/1992 | Greenspun ................ | G01S 5/06 342/451 |
| 5,889,490 A | | 3/1999 | Wachter et al. | |
| 6,922,431 B1 | | 7/2005 | Granestrand et al. | |
| 7,202,941 B2 | * | 4/2007 | Munro .................... | G01S 7/483 356/4.1 |
| 9,575,184 B2 | * | 2/2017 | Gilliland ................. | G01S 17/10 |
| 9,605,998 B2 | * | 3/2017 | Nozawa ................ | G01J 1/0407 |
| 2004/0135992 A1 | | 7/2004 | Munro | |
| 2016/0003946 A1 | | 1/2016 | Gilliland et al. | |

(Continued)

OTHER PUBLICATIONS

International Search Report and Written Opinion in International Patent Application No. PCT/US2018/026237 dated Dec. 4, 2018. 16 pages.

(Continued)

*Primary Examiner* — James R Hulka
(74) *Attorney, Agent, or Firm* — Smith Baluch LLP (57) ABSTRACT

Lidar uses light to sense the range to an object. It can be used as a sensor, e.g., for autonomous vehicle navigation, or to generate detailed maps of terrain. A lidar can also sense target speed, optical reflectivity, and spectroscopic signature. As lidars become more widespread, one lidar could interfere with another nearby lidar. Incoherent (time of flight (TOF)) lidars can also be spoofed or hacked. And both coherent and incoherent lidars can be jammed. Modulating the lidar source makes the lidar more resistant to interference, jamming and hacking. In a TOF lidar, each transmitted pulse is modulated in a prearranged or predetermined fashion. A processor in the receiver distinguishes true returns from actual returns based on the modulation or encoding of the transmitted pulses. If the modulation is present, the return signal considered genuine. If the modulation is not present, it is deemed fake.

21 Claims, 5 Drawing Sheets

(56) References Cited

U.S. PATENT DOCUMENTS

2016/0061655 A1 3/2016 Nozawa
2017/0329010 A1 11/2017 Warke et al.
2017/0329011 A1 11/2017 Warke et al.

OTHER PUBLICATIONS

Bingjie, W., et al., "Anti-Jamming Performance of Chaotic Lidars," Chinese Journal of Lasers, May 2011, 7 pages.
Kim et al., "Occurrence and characteristics of mutual interference between LIDAR scanners," Proc. of SPIE vol. 9504, p. 95040K-I, 2015, 10 pages.
Kim et al., "A hybrid 3D LIDAR imager based on pixel-by-pixel scanning and DS-OCDMA," Proc. SPIE 9751, Smart Photonic and Optoelectronic Integrated Circuits XVIII, 975119 (Mar. 16, 2016), 8 pages.
Kunert, More Safety for All by Radar Interference Mitigation (MOSARIM) final report, from www.mosarim.eu, 2012, 19 pages.
Lin, F.-Y., "Chaotic Lidar," IEEE Journal of Selected Topics in Quantum Electronics, vol. 10, No. 5, Sep./Oct. 2004, 7 pages.
McManamon, Laser Radar. Progress and Opportunities in Active Electro-Optical Sensing., Com. Chair, Study under contract HHM402-10-D-0036-D0#10. The National Academies Press, Washington, DC (2014), 311 pages.
Molebny et ai., "Laser radar: historical prospective-from the east to the west," Opt. Eng. 56(3), Mar. 2017, p. 031220, 25 pages.
Petit, "Self-driving and connected cars: Fooling sensors and tracking drivers," Black Hat Europe, 2015, 91 pages.
Rybaltowski et al., "New modulation sequence for random-modulation continuous-wave lidar," Proc. SPIE 4484, Lidar Remote Sensingfor Industry and Environment Monitoring II, (Jan. 9, 2002); doi: 10.1117/12.452782, 9 pages.
Rybaltowski et al., "Signal-to-noise ratio in direct-detection mid-infrared Random-Modulation Continuous-Wave lidar in the presence of colored additive noise," Optics Express, vol. 9, No. 8, Oct. 8, 2001, 14 pages.
Satyan et al., "Precise control of broadband frequency chirps using optoelectronic feedback," Opt. Express 17, 15991-15999 (2009), 9 pages.
Takeuchi et al., "Random modulation cw lidar," Applied Optics, vol. 22, No. 9, May 1, 1983, 6 pages.
Wu, W.-T., et al., "Noise suppressions in synchronized chaos lidars," Optics Express, vol. 18, No. 25, Dec. 6, 2010, 8 pages.
Zhao, T., et al., "Free Space Ranging Utilizing Chaotic Light," Mathematical Problems in Engineering, vol. 2013, Article ID 172728, 7 pages, 2013.
Zhong, D., et al, "Real-time multi-target ranging based on chaotic polarization laser radars in the drive response VCSELs," Optics Express, vol. 25, No. 18, Sep. 4, 2017, 21 pages.

* cited by examiner

LIDAR RESISTANT TO INTERFERENCE AND HACKING

GOVERNMENT SUPPORT

This invention was made with Government support under Contract No. FA8721-05-C-0002 awarded by the U.S. Air Force. The Government has certain rights in the invention.

BACKGROUND

Laser radar, lidar or ladar is an important type of optical sensor that has both military and commercial applications. Lidar can generate detailed three-dimensional (3D) maps of terrain, from a variety of platforms: surface (such as cars), air (from drones or airplanes), naval, space (from missiles), etc. Lidars can also sense target speed, optical reflectivity, and spectroscopic signatures. Recently, lidar has been proposed as a key sensor in autonomous vehicles.

SUMMARY

As lidars become more widespread, one lidar could interfere with another nearby lidar. Also, lidars can be spoofed or hacked. Lidar receivers that are incoherent suffer from these issues. Coherent lidar receivers do not suffer from interference and spoofs. However, both coherent and incoherent receivers can be blinded by a jammer, which sends large amounts of light to the sensor. A lidar designer can use narrow field of view optics, scan angularly the receive aperture, or use narrow optic filters to lower the chance of interference, hacking and jamming. Nevertheless, a trace amount of light can still be received and thus confuse the lidar sensor. Then, the sensor could think the target is a different location.

To address problems associated with interference, spoofs, and jammers, the inventive methods and systems for light detection and ranging distinguish between true and false returns. Example methods include illuminating a scene with a modulated series of optical pulses with a transmitter. A receiver receives a modulated series of optical returns scattered and/or reflected from at least one object in the scene and a spurious series of optical returns, e.g., from a jammer or interference source. A processor coupled to the receiver distinguishes the modulated series of optical returns from the spurious series of optical returns based on modulation of the modulated series of optical pulses.

In some cases, the transmitter may include a laser that generates a series of optical pulses and an external modulator that modulates those pulses to produce the modulated series of optical pulses. Alternatively, the laser may be modulate directly instead of or in addition to modulating the laser output with an external modulator.

In either case, the transmitter may modulate the pulses by varying a pulse repetition frequency, an optical carrier wavelength, a polarization, or an amplitude of the series of optical pulses. The transmitter may also modulate the series of optical pulses by impressing a radio-frequency (RF) subcarrier on the series of optical pulses. In this case, the processor can distinguish the modulated series of optical returns from the spurious series of optical returns by identifying the modulated series of optical returns based on the RF subcarrier impressed on the series of optical pulses. Or the transmitter may modulate the series of optical pulses by imparting a code on N optical pulses in the series of optical pulse, where N is an integer greater than 1. In this case, the receiver receives the modulated series of optical returns and the spurious series of optical returns over N time slots, and the processor identifies the modulated series of optical returns based on the code.

For instance, the processor may filter the modulated series of optical returns from the spurious series of optical returns with a filter matched to the modulation of the modulated series of optical pulses.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

1 Modulating a Lidar Source to Mitigate Interference and Jamming

Modulating the optical source of a lidar with a unique modulation or encoding can make the lidar more resistant to interference, jamming and hacking. The processor in the lidar receiver looks for that unique modulation or encoding. If the modulation is present, the return signal is considered genuine. If the modulation is not present, it is deemed fake.

The effectiveness of this scheme depends on a modulation that is not easily copied and that is relatively unique. The scheme also depends on a processor that can distinguish or discriminate between what is real and fake. For example, the processor may have a match filter to lock on to the desired modulation.

The lidar source can be modulated in many different ways. If the lidar is a pulsed lidar, the pulse repetition frequency (or equivalently, pulse repetition interval or time between pulses) or relative optical phase between pulses may be modulated on a pulse-to-pulse basis. For pulsed and continuous wave (cw) lidars, the optical frequency, optical polarization, optical intensity, radio frequency (RF) subcarrier amplitude, RF subcarrier frequency, or RF subcarrier phase may be varied as a function of time or pulse number.

Lidars with sources modulated to mitigate interference and jamming have both commercial and defense applications. They can be used to produce high-resolution 3D maps for autonomous vehicle navigation or robots. They can also be used to produce high-resolution 3D maps of terrain, roads, buildings, etc. from airplanes or other platforms. And they can be used to measure wind speeds and detect wind shear at airports for safer flight control.

2. A Pulsed Lidar with a Modulated Pulse Repetition Interval/Frequency

Figure 1A:
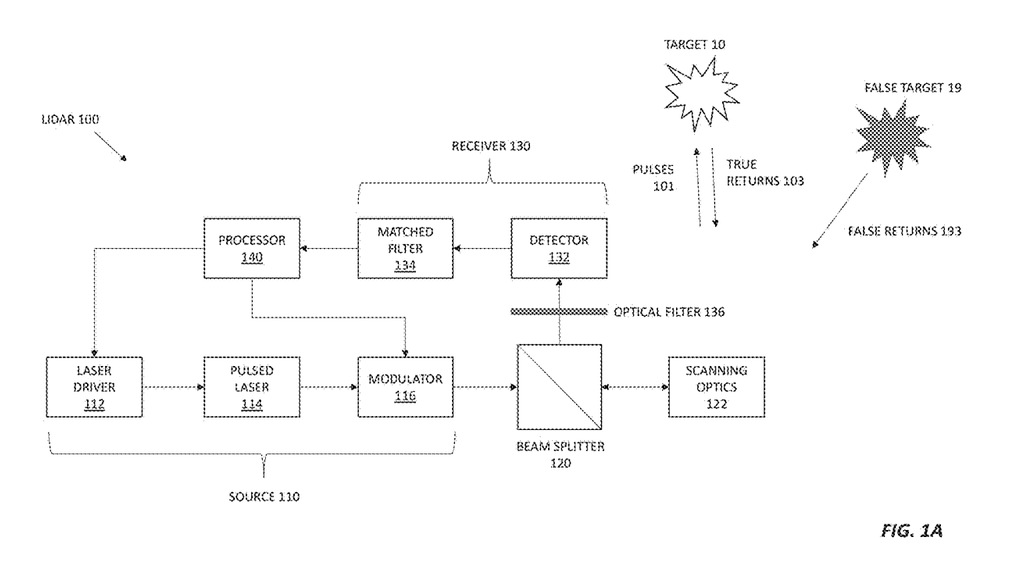
FIG. 1A shows a pulsed lidar that emits a series of optical pulses whose pulse repetition interval (or equivalently pulse repetition frequency) is varied to distinguish true returns from spurious returns.

FIG. 1A shows a monostatic pulsed lidar 100 whose pulse repetition frequency (PRF), pulse repetition rate (PRR), or pulse repetition interval (PRI) is varied or modulated to reduce susceptibility to interference and jamming. The lidar 100 includes a source 110, a beam splitter 120, scanning optics 122, a receiver 130, and a processor 140. The source 110 includes a laser driver 112, a pulsed laser 114, and an optional modulator 116. And the receiver 130 includes an optional optical filter 136, at least one detector 132, and an optional matched filter 134. The beam splitter 120 can be replaced by two apertures: one for transmit and one for receive. Or the beam splitter 120 can be replaced by an optical circulator or switch. The lidar 100 may include other components, including optical and electronic amplifiers, as readily understood in the art.

In operation, the pulsed lidar 100 determines range to a target 10 via a time of flight (TOF) measurement. It does this by generating a series of optical pulses, or optical pulse train 101, with the pulsed laser 114 in response to an electrical signal from the laser driver 112. The pulses 101 are modulated with the modulator 116 as described below and propagate through the beam splitter 120 to the scanning optics 122 (e.g., a collimating lens and a scanning mirror), which direct the pulses 101 to the target 10. The target 10 reflects or scatters the laser pulse train 101 back toward the lidar 100 in the form of optical returns 103.

The scanning optics 122 and beam splitter 120 couple the returns 103 to the receiver 130. The optional optical filter 136 reflects or attenuates light at optical frequencies outside the band of the emitted pulses 101 and the true returns 103. The detector 132 converts the filtered returns 103 into electrical signals that are filtered by the (optional) matched filter 134 before being processed by the processor 140 to yield the target's range and velocity.

Figure 1B:
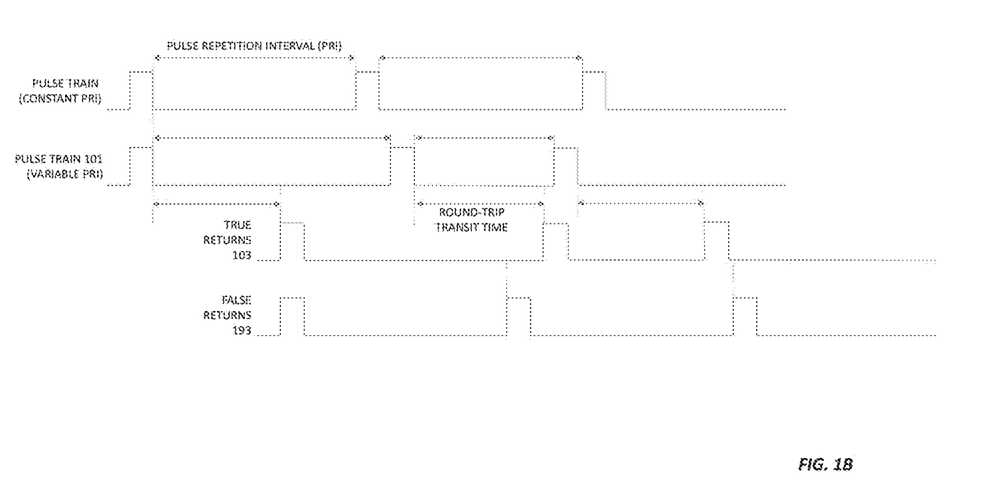
FIG. 1B shows a lidar pulse train with a constant pulse repetition interval (PRI; top), a lidar pulse train with a variable PRI (upper middle), true lidar returns in response to the lidar pulse train with the variable PRI (lower middle), and false lidar returns with a constant PRI (bottom).

In a conventional pulsed lidar, the PRI or time between successive pulses is constant as shown in the top trace of FIG. 1B. If the target is stationary with respect to the lidar, the delay between each pulse and the corresponding return is also constant (as in the top and bottom traces of FIG. 1B). This delay is the round-trip transit time. For a monostatic lidar, the range from the lidar to the target is half the round-trip transit time (i.e., the time between the transmission of the pulse and the detection of the return) divided by the speed of light. If the target is moving toward to the lidar, then the round-trip transit time for successive returns will appear at successively decreasing time intervals. And if the target is moving away from the lidar, then the delay successive returns will appear at successively increasing time intervals.

Instead of transmitting pulses separated by a constant PRI, the lidar 100 in FIG. 1A transmits pulses 101 separated by a PRI that varies, e.g., on a pulse-to-pulse basis. For instance, the PRI may be varied in a discrete/digital fashion, e.g., by stepping among time slots in prearranged steps. This PRI variation may be imparted by the modulator 116 or by driving the pulsed laser 114 with an appropriate signal from the laser driver 112. In either case, the variation or modulation of the PRI may be controlled by the processor 140 and used by the processor 140 to process the returns as described below. If the target 10 remains stationary with respect to the lidar 100, the round-trip time between the pulses 101 and the respective true returns 103 remains constant even though the PRI changes from pulse to pulse.

If a hacker, another lidar, or other source of interference mimics the lidar's pulse train 101 and sends a copied pulse train 193 into the lidar's receiver 120, the lidar 100 may be tricked or spoofed into detecting a false target 19. Like the real target 10, this nonexistent target 19 will appear at a range given by half the delay between the lidar's pulse train 101 and the copied pulse train 193 divided by the speed of light. But if the copied pulse train 193 or interference lidar has a constant PRI, e.g., as in the bottom trace of FIG. 1B, or a PRI whose variation doesn't match the PRI variation of the emitted pulse train 101, the apparent round-trip time delay associated with the false target 19 will vary from pulse to pulse. This variation in apparent round-trip time delay may cause the false target 19 to appear with a nonzero range rate or velocity.

Because the processor 140 controls the variation of the emitted pulse train's PRI, it can distinguish between the true returns 103 and the false returns 193 based on the variation of the emitted pulse train's PRI. If the false returns 193 have a constant PRI, for example, then the false target 19 should appear to move a velocity related to the modulation of the emitted pulse train's PRI. If the processor 140 modulates the emitted pulse train's PRI at a particular frequency, then the false returns 193 can be filtered out by tuning the matched filter 134 to that frequency.

The processor 140 may also vary the PRI with a long sequence of seemingly random timing intervals. This makes it harder for a hacker to copy and mimic the pulse train 101 emitted by the lidar 100. Increasing the number of possible distinct intervals and the pulse sequence length N should make the pulse train 101 harder to copy. To see how, consider a scenario in which the lidar 100 sends and receives N pulses and estimates the ranges R the target was at times where i=1, 2, . . . . N. The instantaneous velocity at time $t=(t_i+t_{i+1})/2$ is $(R_{i+1}-R)/(t_{i+1}-t_i)$. The acceleration $A_i$ at time $t_i$ is $(R_{i+1}+R_{i-1}-R_i)/(t_{i+1}/2+t_{i-1}/2)^2$. The lidar processor 140 checks if the velocities and accelerations associated with these N ranges and N times are within expectations of a typical physical target. If a hacker injects a pulse train with the wrong PRI sequence, the estimated ranges R would be wrong and have a lot of variation between successive ranges. The velocities Vi would look like random noise with large, unphysical accelerations.

3 Modulating Optical Phase, Intensity, or RF Subcarriers

PRI or PRF is just one type of modulation that can be used to distinguish spurious returns from actual returns in a TOF pulsed lidar. Other types of modulation suitable for distinguishing true returns from spurious returns include, but are not limited to optical phase modulation, intensity modulation, and RF subcarrier modulation.

Referring again to FIG. 1A, if the modulator 116 is an optical phase modulator (e.g., an electro-optic phase modulator), the processor 140 may drive it to vary the optical phase of the emitted pulses 101. For making TOF measurements, the processor 140 encodes each pulse in pulse train 101 (or time slot within a single pulse or cw waveform) with a known phase change, i.e., the phase difference between this pulse (or time slot) and the previous pulse (or time slot). The receiver 130 compares the current return's phase with the previous return's phase, and accepts only those returns 103 the correct pulse change.

Figure 1C:
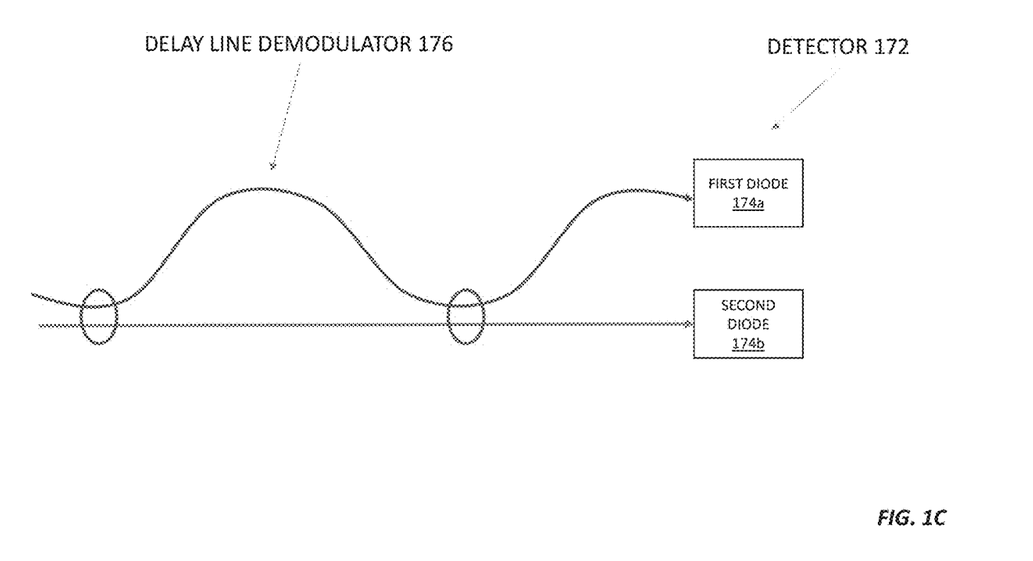
FIG. 1C shows a differential detector suitable for use in place of the optical filter, matched filter, and optical detector in the lidar of FIG. 1A.

The receiver 130 may compare the phases of the current and previous returns using an asymmetric Mach-Zehnder interferometer or delay-line demodulator 176 and differential detector 172 as in FIG. 1C. The asymmetric delay-line demodulator 176 replaces the optical filter 136 shown in FIG. 1A and splits the return light into two paths. The time difference between the two paths equals the slot duration or the pulse repetition interval. The balanced detector 172 replaces the detector 132 in FIG. 1A and includes two diodes or detectors 174a and 174b. In differential phase-shift keying (DPSK) encoding, if the phases of two consecutive pulses (or time slots) are the same, the return light will go to one diode (e.g., diode 174a) and be marked as a "zero." If phases are different, the light goes to the other diode (e.g., diode 174b) and is marked as a "one." The processor 140 compares the received sequence of N zero's and one's with the transmitted sequence to distinguish between true and fake returns. This can be extended to other types of modulation, including but not limited to quadrature phase shift keying (QPSK) and quadrature amplitude modulation (QAM)-16.

If the modulator 116 in FIG. 1A is an optical intensity modulator (e.g., a lithium niobate Mach-Zehnder modulator, electro-absorption modulator, or acousto-optical modulator), it can be used to modulate the intensity of the pulses 101 or of a continuous-wave (cw) signal that illuminate the scene. This intensity modulation may be in the RF band (e.g., at microwave frequencies). Different targets may have different reflectivities and ranges, so different targets may produce different received optical powers. To account for these reflectivity and range differences, the lidar processor processes multiple (N>2) pulses/slots to distinguish between these target power differences and transmitter power modulation.

For example, for N=5 pulses or slots, the modulator 116 can encode the pulses by lowering the intensity some of the pulses (e.g., the first, second, and fifth pulses) and keeping the other pulses unattenuated (e.g., the third and fourth pulses). In this example, the processor 140 checks if the first, second, and fifth returns have slightly less power than the third and fourth returns. If so, the returns are considered to be true returns. If not, the returns are considered to be fake and ignored. In practice, because the range and reflectivity vary, the source 110 may repeat the sequence of N pulses for K (K≥2) times. And the processor 140 may average the K pulses to distinguish between true and fake returns.

The modulator 116 in FIG. 1A can also be used to impress modulation on an RF subcarrier on the pulses 101. For example, the modulator 116 may modulate the RF subcarrier's amplitude, frequency, phase, or any combination thereof. After optical detection, the RF signals are digitized so the lidar processor can look for the subcarrier originally impressed on the transmitter. One can extend this concept to N pulses (or time slots) and then look for the correct sequence of N modulations.

Figure 2:
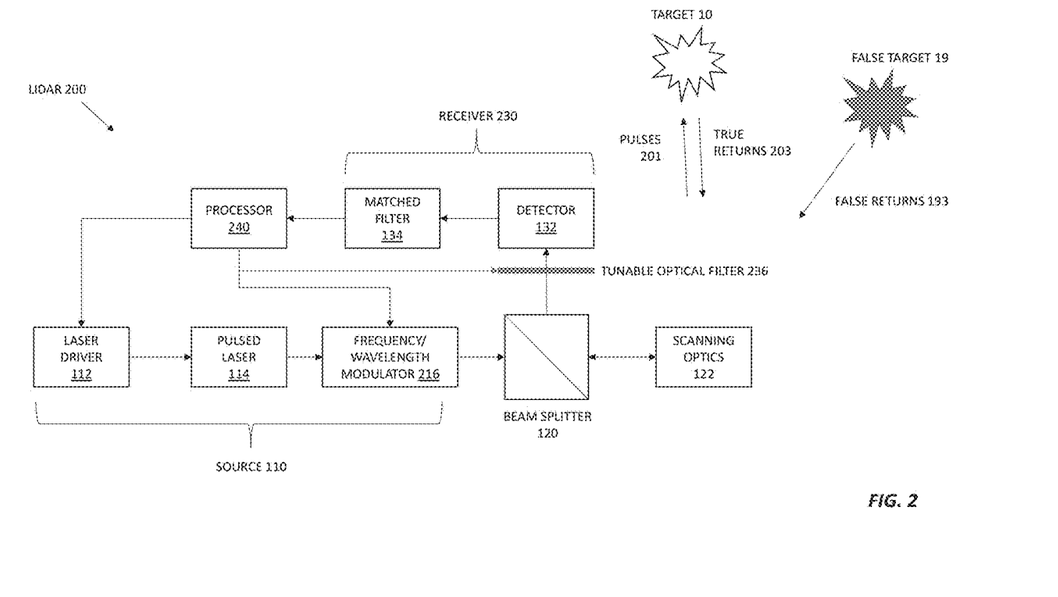
FIG. 2 shows a pulsed lidar that emits a series of optical pulses whose frequency is varied from pulse to pulse to distinguish true returns from spurious returns.

4 Optical Frequency Modulation for Interference, Hacking, and Jamming Mitigation FIG. 2 shows a version 200 of the lidar 100 in FIG. 1A modified to modulate the optical (carrier) frequency of the emitted light to mitigate, reduce, or eliminate unwanted interference, hacking, or jamming. This lidar 200 includes a processor 240 and a frequency/wavelength modulator 216 configured modulate the optical carrier frequency or wavelength of the pulses in the pulse train 201. Optical frequencies can be modulated onto the pulse train 201 via many methods, including but not limited to: single sideband suppressed carrier (SSB-SC) modulation with the external modulator 116, serrodyne modulation, current modulation/feedback using the laser driver 112, etc.

For detect direction, the processor 240 selects the correct optical frequency via a tunable optical filter 236 in the receiver 230. The processor 240 tunes this optical filter 236 to pass true returns 203, which are in the same optical frequency band as the pulse train 201, and to reject the incorrect frequencies that come from a hacker or interference. To get tighter frequency filtering and rejection, one can use a coherent detector (not shown) to collect and measure the true returns 203. The coherent detector converts the optical frequencies to RF or electrical frequencies, which are filtered with an RF filter (e.g., a matched filter 134) or selected by the processor 240. In either case, the filter or processor 240 passes the signals having the appropriate frequency and rejects signals at other incorrect frequencies, which come from hacking and interference. The appropriate frequency would be the frequency at the transmit time, which is the receive time minus the transit time (i.e., time of flight). As before, such a lidar may be harder to hack if there are many possible frequencies and the sequence length N is long (e.g., N=100, 1000, or 10,000).

5 Polarization Modulation for Suppressing Interference and Jamming

Figure 3:
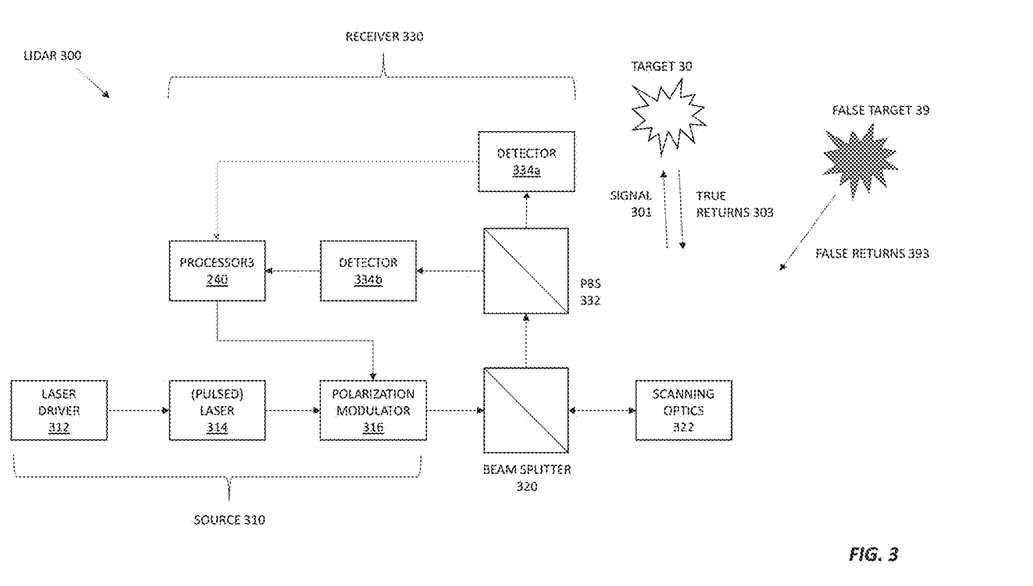
FIG. 3 shows a pulsed lidar that emits a series of optical pulses whose polarization state is varied from pulse to pulse to distinguish true returns from spurious returns.

FIG. 3 illustrates a lidar 300 that encodes pulses 301 with distinct optical polarizations using a polarization rotator or polarization modulator 316, such as a Pockels cell. The polarization modulator 316 modulated the output of a (pulsed) laser 314, which is driven by a laser driver 312. Together, the laser driver 312, laser 314, and polarization modulator 316 make up a transmitter or source 310 that emits a polarization-encoded signal 301, such as a series of pulses in distinct polarization states, as controlled by a processor 340. A beam splitter 320 and scanning optics 322 scan the polarization-encoded signal 301 across a scene.

If the scene includes a real target 30, then that target 30 reflects or scatters at least part of the incident polarization-encoded signal 301 back toward the lidar 300 as true returns 303. If a jammer, hacker, or interference source (e.g., another lidar) is nearby, the lidar 300 may also receive false returns 393 from a false target 39. A receiver 330 in the lidar 300 processes both the true returns 303 and the false returns 393.

In the receiver 330, a polarization beam splitter (PBS) 332 projects the vertical and horizontal polarization states onto two separate detectors 334a and 334b (collectively, detectors 334). The PBS can be supplemented by quarter-wave plates (not shown) to separate left circular polarization from right circular polarization. Or the receiver may use a polarization analyzer (with four detectors) to measure the entire Jones and Stokes polarization vectors. The detectors 334 transduce the optical signals into photocurrents or voltages suitable for the lidar processor 340, which looks for signals in the photocurrents or voltages whose amplitudes correspond to the appropriate polarization state, namely, the polarization sent by the transmitter 310 during the last transmit period. All other polarization states are considered incorrect and are rejected or ignored by the processor 340. One can extend this concept to N pulses (or N time slots) and then look for the correct sequence of N polarization encodings.

6 Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of light detection and ranging, the method comprising:
stepping optical pulses through a series of time slots in pre-arranged steps to produce a modulated series of optical pulses;
illuminating a scene with the modulated series of optical pulses;

receiving a modulated series of optical returns scattered and/or reflected from at least one object in the scene;

receiving a spurious series of optical returns; and distinguishing the modulated series of optical returns from the spurious series of optical returns based on modulation of the modulated series of optical pulses.

2. The method of claim 1, wherein the pre-arranged steps are selected to produce a sequence of seemingly random timing intervals between the optical pulses in the modulated series of optical pulses.

3. The method of claim 1, further comprising:
varying an optical carrier wavelength of the optical pulses in the modulated series of optical pulses.

4. The method of claim 1, further comprising:
varying a polarization of the optical pulses in the modulated series of optical pulses.

5. The method of claim 1, further comprising:
varying an amplitude of the optical pulses in the modulated series of optical pulses.

6. The method of claim 1, wherein distinguishing the modulated series of optical returns from the spurious series of optical returns comprises:
determining a variation in successive ranges for successive optical returns in the spurious series of optical returns; and
determining that the variation in successive ranges for successive optical returns in the spurious series of optical returns is outside of expectations for a physical target.

7. The method of claim 1, wherein distinguishing the modulated series of optical returns from the spurious series of optical returns comprises:
determining instantaneous velocities and accelerations based on the spurious series of optical returns; and
determining that the instantaneous velocities and accelerations represent velocities and/or accelerations outside of expectations for a physical target.

8. The method of claim 1, wherein receiving the spurious series of optical returns comprises receiving signals from a jammer.

9. The method of claim 1, wherein receiving the spurious series of optical returns comprises receiving signals from an interference source.

10. The method of claim 1, wherein distinguishing the modulated series of optical returns from the spurious series of optical returns comprises filtering the modulated series of optical returns from the spurious series of optical returns with a filter matched to the modulation of the modulated series of optical pulses.

11. A system for light detection and ranging, the system comprising:
a transmitter configured to illuminate a scene with a modulated series of optical pulses;
a receiver configured to receive a modulated series of optical returns scattered and/or reflected from at least one object in the scene and a spurious series of optical returns, wherein the receiver is configured to delay a first copy of each optical return with respect to a second copy of each optical return by a delay equal to a time slot width of the modulated series of optical pulses; and
a processor operably coupled to the receiver and configured to distinguish the modulated series of optical returns from the spurious series of optical returns based on modulation of the modulated series of optical pulses.

12. The system of claim 11, wherein the transmitter comprises:

a laser configured to emit a series of optical pulses; and
a modulator, operably coupled to the laser, to modulate the series of optical pulses to produce the modulated series of optical pulses.

13. The system of claim 12, wherein the modulator is configured to vary a pulse repetition frequency of the series of optical pulses.

14. The system of claim 12, wherein the modulator is configured to vary an optical carrier wavelength of the series of optical pulses.

15. The system of claim 12, wherein the modulator is configured to vary a polarization of the series of optical pulses.

16. The system of claim 12, wherein the modulator is configured to vary an amplitude of the series of optical pulses.

17. The system of claim 12, wherein the modulator is configured to impress a radio-frequency (RF) subcarrier on the series of optical pulses and the receiver is configured to identify the modulated series of optical returns based on the RF subcarrier impressed on the series of optical pulses.

18. The system of claim 12, wherein the modulator is configured to impart a code on N optical pulses in the series of optical pulse, where N is an integer greater than 1, and the receiver is configured to receive the modulated series of optical returns and the spurious series of optical returns over N time slots and to identify the modulated series of optical returns based on the code.

19. The system of claim 12, wherein the receiver comprises:
an asymmetric delay-line demodulator having two optical paths with an optical delay equal to a time slot width of the modulated series of optical pulses; and
a balanced detector, in optical communication with the asymmetric delay-line demodulator, to detect outputs from the two optical paths of the asymmetric delay-line demodulator.

20. The system of claim 19, wherein the balanced detector is further configured to emit a first sequence of zeros and ones in response to the modulated series of optical returns and a second sequence of zeros and ones in response to the spurious series of optical returns.

21. A system for light detection and ranging, the system comprising:
a laser source configured to generate a series of optical pulses;
a polarization modulator operably coupled to the laser source and configured to modulate polarizations of respective optical pulses in the series of optical pulses;
a transmitter operably coupled to the laser source and/or the polarization modulator and configured to illuminate a scene with the series of optical pulses;
a polarizing beam splitter to project a series of optical returns scattered and/or reflected from at least one object in the scene and a spurious series of optical returns into different polarization states;
photodetectors in optical communication with the polarizing beam splitter and configured to measure amplitudes of the different polarization states; and
a processor operably coupled to the receiver and configured to distinguish the modulated series of optical returns from the spurious series of optical returns based on the amplitudes of the different polarization states of the series of optical returns and the spurious series of optical returns.

* * * * *